Aug. 23, 1938. B. MAMMANO 2,127,779
TOOL FOR CUTTING CURVED TOOTH BEVEL GEARS
Filed Feb. 10, 1936 3 Sheets-Sheet 1
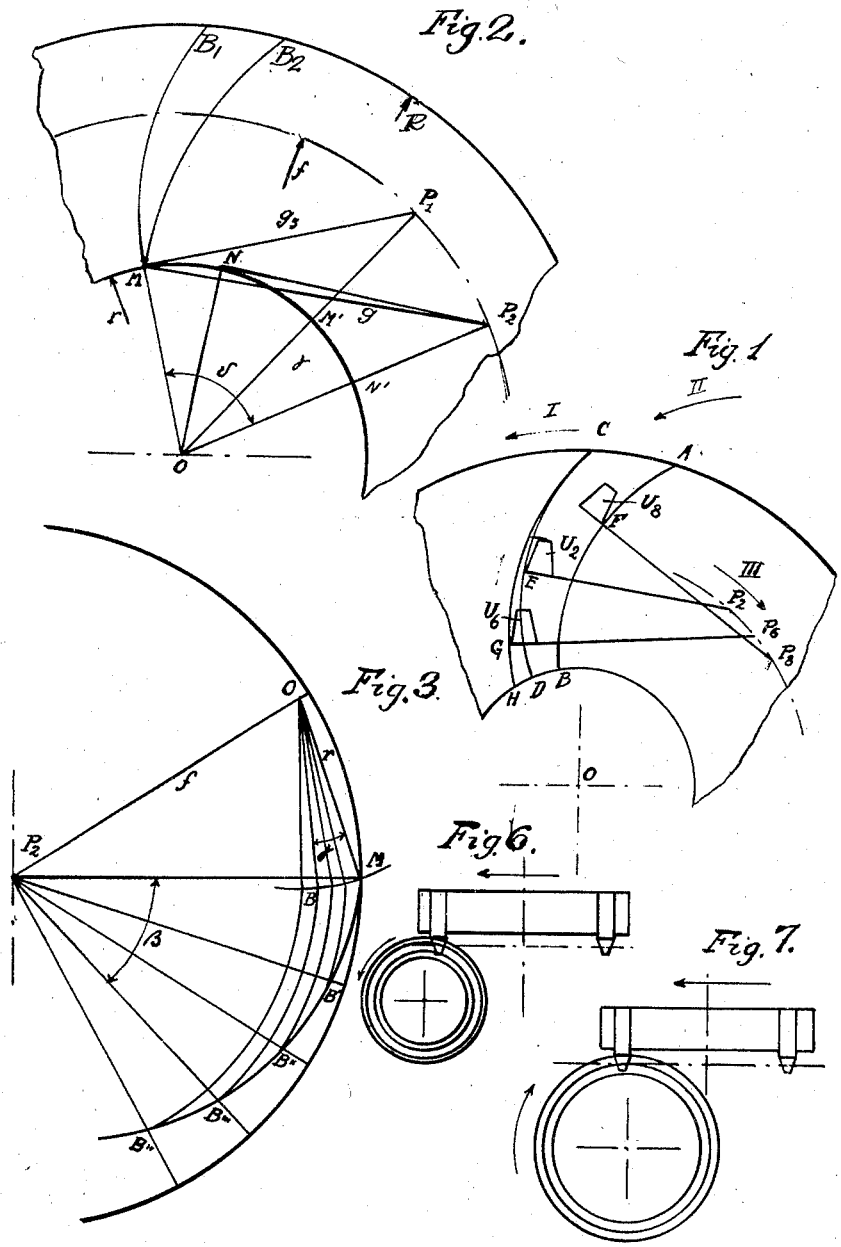

Aug. 23, 1938. B. MAMMANO 2,127,779
TOOL FOR CUTTING CURVED TOOTH BEVEL GEARS
Filed Feb. 10, 1936 3 Sheets-Sheet 2
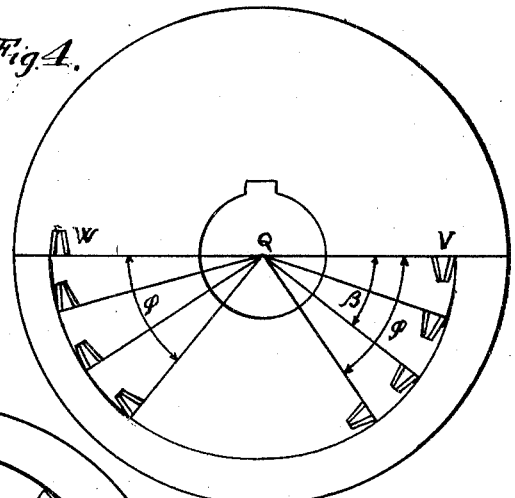
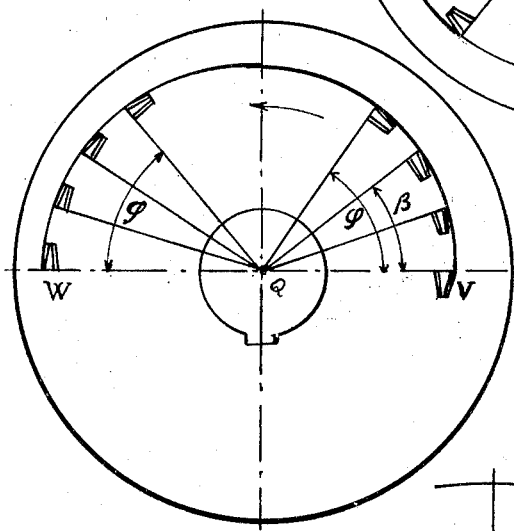
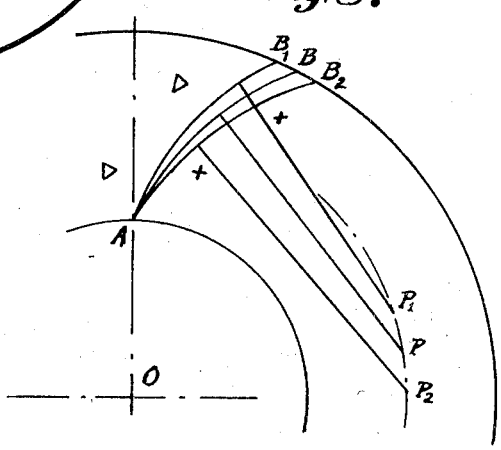
B. Mammano
INVENTOR
By: Glascock Downing & Seebold
Attys.

Aug. 23, 1938. B. MAMMANO 2,127,779
TOOL FOR CUTTING CURVED TOOTH BEVEL GEARS
Filed Feb. 10, 1936 3 Sheets-Sheet 3

INVENTOR.
B. Mammano
BY Hascock Downing v Siebold
Attys.

Patented Aug. 23, 1938

2,127,779

UNITED STATES PATENT OFFICE 2,127,779

TOOL FOR CUTTING CURVED TOOTH BEVEL GEARS

Benedetto Mammano, Milan, Italy, assignor to "Societa Ingranaggi Mammano", Milan, Italy, a company of Italy Application February 10, 1936, Serial No. 63,232

12 Claims. (Cl. 29—105)

This invention relates to a tool for cutting curved tooth bevel gears.

Methods of producing bevel gears with curved teeth in which the generation of the flanks of the teeth is obtained by causing the gear blank to roll over an imaginary crown wheel, are well known. The path of the cutters rotating about the axis of the tool, which axis is parallel to the axis of the imaginary crown wheel, represents a tooth of the said crown wheel with which the blank can be regarded as mating.

These methods can be divided into two categories. To the first category belong discontinuous methods using dividing apparatus for indexing, in which the gear blank is substantially stationary during the cutting of a tooth. To the second category pertain the methods without dividing apparatus in which the gear blank as well as the cutting tool rotates continuously at a uniform angular speed, thus having a continuous indexing movement.

The tools of the second category have the cutters disposed at different distances from the axis of the tool, in order to ensure that, during the rotation of the blank, the cutters are always engaged with the same rotating tooth space. The cutters are generally disposed according to an Archimedean spiral, analogous to the helicoidal cutters of a hob in the hobbing process for cutting spur gears.

Now it is well known that: (1) the bevel gear teeth differ in size and form from the larger to the smaller base of the pitch cone; (2) during the continuous rotation of the blanks its peripheral speeds are different from the larger to the smaller base of the pitch cone; (3) by changing the distance between the axes of the tool and the crown wheel or the radius of the tool the mating conditions of the rotating cutters and the rotating tooth space are changed. For these reasons which are more fully explained hereinafter, the said arrangement of cutters according to the Archimedean spiral produces important defects and until now no machines have been capable of cutting curved tooth bevel gears with continuous rotation of the blank.

According to the present invention a geometrical arrangement of cutters is provided in order to cut the said curved teeth of bevel gears accurately and continuously.

For this purpose the tool axis is arranged parallel to the axis of the basic crown wheel and the tool is provided with a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut.

In order that the invention may be more easily understood and readily carried into effect reference is now made to the accompanying drawings in which:—

Figs. 1, 2 and 3 are diagrammatic plan views of crown wheels;

Figs. 4 and 5 are diagrammatic plan views of tools according to the invention;

Figs. 6 and 7 show the positions and motions between the tool and the blank to be cut;

Fig. 8 shows the procedure for drawing the outline of a tool according to the invention;

Figure 9:
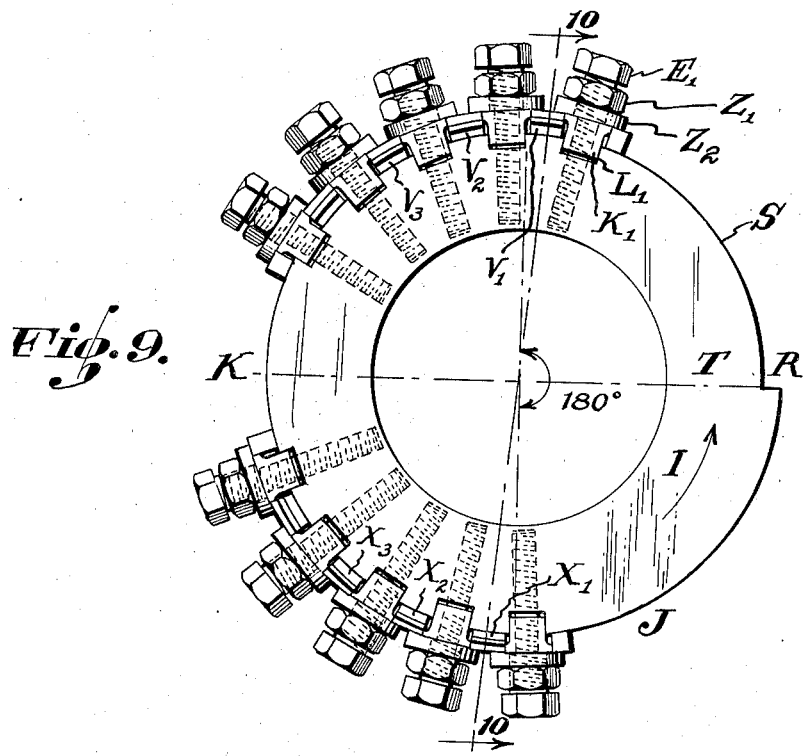
Fig. 9 is a top plan view of the tool.

As the blank to be cut is continuously rotating, the crown wheel shown in Fig. 1 must be considered to be continuously rotating about the axis O, in the direction shown by the arrow I.

The curves AB and CD represent the plane sections of the correct flanks of two adjacent teeth (with the pitch plane of the crown wheel). These curves are slightly different from circular arcs although made by cutting points of cutters rotating about their axis, because of the continuous rotating motion of the crown wheel during the continuous rotation of the cutters.

Now let us suppose that the curve AB is traced by the point F of the cutter $U_8$ rotating about its axis (this axis being in the position $P_8$) with the radius $P_8F$ and the direction shown by the arrow II.

Let us suppose that another cutter $U_2$ is actually fixed in the cutter block at 180° relatively to the cutter $U_8$ (though not shown so on the Figure 1). During the actual working of the cutter $U_8$ rotating about the position $P_8$ of the cutter block centre and producing the curve AB, the cutter $U_2$ is diametrically opposite and doing nothing.

During the intervening time between $U_8$ leaving the point B and $U_2$ arriving at the external circle of the crown wheel, this crown wheel will be rotated for a certain angle which depends upon the duration of the above interval. Let us suppose that by this rotation the curve AB is translated in the position of the curve CD. Of course the curve CD must be the same as the curve AB (although they are not circular arcs) then we must suppose that the point E has the same radius P₈F and therefore the position of the cutter block centre must be supposed to be displaced from the position P₈ to the position P₂, this displacement depending upon the above interval.

By this method we can consider the formation of the tooth flanks, when the blanks (that is the crown wheel) are continuously rotating, being made in the following manner; that is the concave curve CD is traced by the external point E of the cutter U₂ rotating about the position P₂ of the cutter block centre with the radius P₂E and the convex curve AB by the internal point F of the cutter U₈ rotating about the position P₈ of the cutter block centre with the radius P₈F which has the same length of the radius P₂E.

The displacement between the positions P₂ and P₈ of the cutter block centre depends upon the continuous rotation of the crown wheel.

Now we consider another cutter U₆ actually fixed in the cutter block between the said cutters. The position of its centre will be P₆. The radius of the cutting point G will be P₆G, having a length different from the radii P₂E and P₈F because of the Archimedean spiral disposition. As these different radii are rotating about different centres, the paths will also be different. Therefore if the path of the cutter U₆ is CH (Fig. 1) the concave side CD of the teeth will be destroyed by the cutter U₆ by the amount of the area comprised between the curves CD and CH. In order to avoid this destruction it is not enough to have different radii of the cutters according to an Archimedean spiral, because of the influence of the circumferential path of the centres of the tool and other elements. If AB and CD are the correct sides of teeth to be cut, the paths of the other cutters must coincide with these curves or, if this is not possible, the said paths must be comprised among the said curves lying in the tooth spaces. In order to obtain these results the following arrangement is adopted.

(1) Two cutters called "finishing cutters" V and W (see Figs. 4 and 5) are disposed at 180° and with different radii from the axis of the tool, in such a manner that the external cutting point of the cutter V (lying in the pitch plane of the crown wheel) will have the same distance from the said axis as the internal cutting point of the cutter W. The cutter V is called "the external finishing cutter for the concave flanks" and the cutter W is called "the internal finishing cutter for the convex flanks". This arrangement traces the concave and convex flanks of teeth with the same curves.

(2) Other cutters called "subsidiary cutters" are provided to be assembled with the finishing cutters (see Figs. 4 and 5) disposed within an angle ρ about 45° and not greater than 60°, each cutter being at a different radius. The subsidiary cutters assembled near to the external finishing cutter are called "subsidiary external cutters" and the others are called "subsidiary internal cutters". The radii vary according to two typical arrangements, one in which every cutter has a greater radius than the previous cutter (as in Fig. 4), and another in which every cutter has a smaller radius than the previous one (as in Fig. 5). A cutter is of course said to be previous with respect to another cutter according to the direction of motion of the tool shown in Figs. 4 and 5 with the arrow I. The first arrangement refers to the case represented by Fig. 6 in which the tool T rotates anti-clockwise looking at the front and the blank rotates towards the outside of the tool. The second arrangement refers to Fig. 7 in which the tool rotates in the same direction as in the first case, but the blank rotates in the opposite direction to that in the first case. The arrangements shown in Figs. 6 and 7 are necessary to cut correctly mating gears.

(3) The difference of radii between a finishing cutter and any subsidiary cutter is defined by the following rules. In order to avoid confusion we will refer always to the normal half pitch of the teeth BH (see Fig. 1) at the small end of the pitch cone, which half pitch is hereinafter termed the "normal small half pitch" of teeth to be cut. We will also refer to the circumferential space BD at the small end of the pitch cone. If $p$ is the diametral pitch at the radius $r$ of the small cone radius, we have $$BD = \frac{\pi}{2p}$$

and $p$ is hereinafter termed "the small diametral pitch" of teeth to be cut.

Now the angle $\beta$ between the finishing cutter V and the subsidiary cutter S (see Figs. 4 and 5) corresponds to the angle $\gamma$ (see Fig. 2) between the centre positions P₁ and P₂ in the crown wheel. The said angle $\gamma$ is easily calculated from the consideration that for one complete rotation of the tool the crown wheel must rotate through the angle of one tooth, that is through the angle given by $$\frac{\pi}{pr}$$

in which $p$ is the small diametral pitch and $r$ is the small cone radius. Thence we derive $$\gamma = \frac{\beta}{2pr} \qquad (1)$$

In Fig. 2 MP₂ is the radius $g$ of the finishing cutter, the angle $\delta$ is previously fixed according to requirements, and the distance $f$ between the axes of the tool and the crown wheel is the radius of the circumferential path of the centres of the tool under the considerations above referred to for the relative motion of the crown wheel. Given the radius $f$ and the angle $\gamma$, we can fix all the positions of the centres of the tool corresponding to every angle of a subsidiary cutter with the corresponding finishing cutter.

Now, by means of different radii, we provide that during the travel of the centre of the tool, the paths of the cutting points of all the subsidiary cutters must coincide at the same point M which lies in the circumference of the small cone radius $r$ as shown in Fig. 2. Here the curves MB₁ and MB₂ traced by the cutters V and S of the tool (represented in Figs. 4 and 5) rotating about the different centres P₁ and P₂ are coincident at the said point M.

This coincidence is absolutely necessary when the thickness of the cutters in the pitch plane of the crown wheel is equal to the normal small half pitch of teeth to be cut. Indeed in this case the subsidiary cutters, the centres of which are travelling, must pass without any clearance through the small tooth space which is supposed stationary. If this were not so, then the subsidiary cutters, although having the thickness BH, would cut a wider space than BH and so destroy the teeth.

In order to obtain all paths coincident at the point M, we must give to the subsidiary cutter S the radius $g_s=MP_1$ which is given by the simple geometric formula:

$$g_s^2 = f^2 + r^2 - 2fr\cos(\delta \pm \gamma) \qquad (2)$$

where the sign — is available practically when $g_s<g$ and the sign + for $g_s>g$. In the Formula (2) only the angle $\gamma$ is variable according to the angle $\beta$ of the subsidiary cutters. From this formula we can deduce that the difference of radii between the finishing and the subsidiary cutters depends upon the distance between the axis of the tool and the crown wheel, the small radius of pitch cone, the radius of the finishing cutter and the small diametral normal half pitch of teeth to be cut.

The geometric method of obtaining all the radii of the subsidiary cutters is shown in Fig. 3. This method is derived from the observation that by tracing in Fig. 2 the point N in such a manner that the arm MN is equal to the arc M'N' we have $P_1M=P_2N$. In Fig. 3 the centre $P_2$ is the axis of the tool, the radii $P_2I$, $P_2II$ etc. correspond to the positions of the cutting profiles of the subsidiary cutters, and the radius $P_2M$ corresponds to the position of the finishing cutter. From the intersection of the circles of radius $r$ with the centre M and radius $f$ with the centre $P_2$ we find the point O and then draw an arc of a circle having the centre O and radius $r$. Hence by drawing the angles $\gamma$ calculated by the Formula (1) and dependent upon the angles $\beta$ we obtain the points B in the said arc and by projecting these points to the corresponding positions of the subsidiary cutters we obtain the points B'. The required radii of the subsidiary cutters are $P_2B'$, $P_2B''$ etc. and by connecting them we obtain the curve MB' B'' B''' B'''' ... of the different lengths of the radii. This curve is called "spiral of the tool" and obviously it is not an Archimedean spiral.

This curve was deduced from the supposition that the thickness of the cutters is equal to the normal small half pitch of teeth to be cut. If this thickness can be taken as smaller than the said normal small half pitch, we can use a different spiral of tool approximating to the above spiral, to be determined in the following manner.

When the angle $\gamma$ is small (see Fig. 2) the angle $MP_2N$ is very small and therefore we can approximately consider $$g_s = P_2N = MP_2 - \widehat{MN} = g - \gamma\rho = g - \frac{\beta}{2p}$$

In this manner the difference between the radii of the cutters is expressed by $$\frac{\beta}{2p}$$

where $p$ is the small diametral pitch of teeth to be cut. The spiral of the tool is in this case an Archimedean spiral having the pitch equal to the small circular pitch of teeth to be cut.

(4) Another peculiarity of the tool according to this invention is that the subsidiary cutters must be set after the finishing external cutter and before the finishing internal cutter, when every cutter radius is greater than the previous one. When every cutter radius is smaller than the previous one, the subsidiary cutters must be set before the finishing external cutter and after the finishing internal cutter. All the above rules are more simply expressed by the rule that the subsidiary cutters must be set in every case in such a manner that the external subsidiary cutters have greater radii than the finishing external cutter, and the subsidiary internal cutters have smaller radii than the finishing internal cutter.

In order to explain this rule we refer to Fig. 8 in which AB is supposed to be a path of a finishing cutter, traced with the radius AP and its centre in position P.

Now let us suppose AB to be the path of the external finishing cutter: this means that the tooth space is lying in the space marked +. Now we consider the paths of two subsidiary cutters, one set before, the other set after the finishing cutter, rotating about the respective positions $P_1$ and $P_2$ of their centres. All the paths coincide at the point A, as hereinabove mentioned, but the radius $P_1A$ is less than PA and $P_2A$ is greater than PA.

Now we observe that the path with the greater radius is lying in the tooth space, while the path with the smaller radius is destroying the flanks of the teeth: in this manner we deduce that the external subsidiary cutters must have greater radii than the finishing cutter and this result can only be obtained by setting the subsidiary cutters after or before the finishing cutter according to the conditions referred to in paragraph (2) above.

Now let us suppose AB to be the path of the internal finishing cutter: that is the tooth space is lying in the space marked Δ. By reasoning in the same manner as above we can easily deduce that the subsidiary internal cutters must have a smaller radius than the finishing internal cutter, this result being again obtained by setting the subsidiary internal cutters before or after the finishing internal cutter as above.

Figure 10:
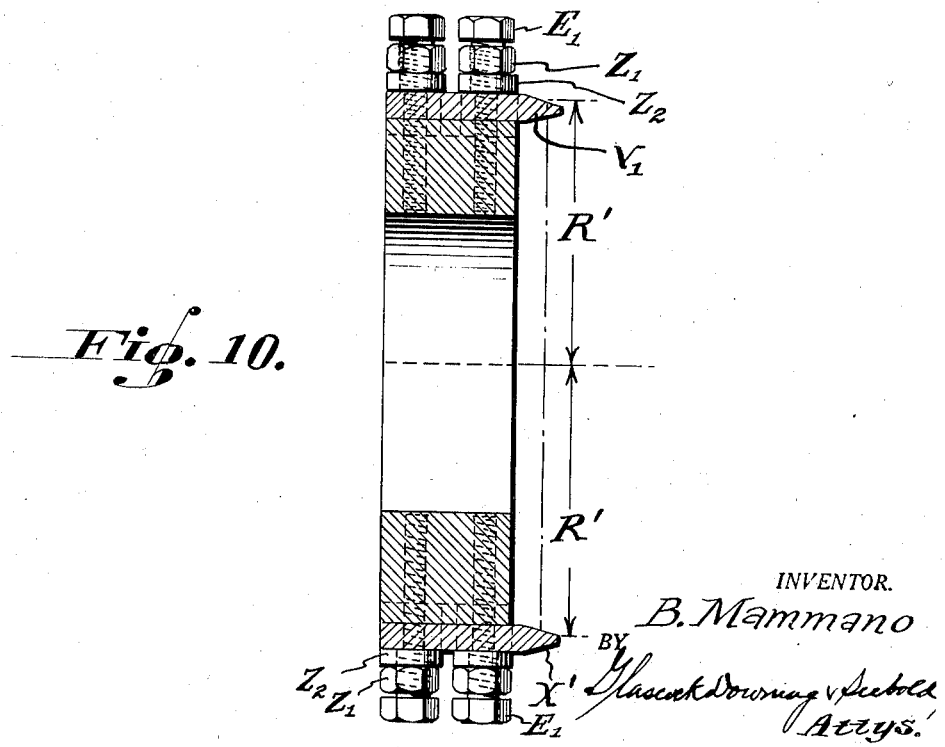
Fig. 10 is a sectional view taken on line 10—10 of Fig. 9 in the direction in which the arrows point.

We will now exemplify a type of embodiment of the above tool by means of Figures 9, 10. In these figures T is the cutter block with its periphery RSKJ in the form of the curve spirals determined by the methods shown in paragraph (3) and produced by lathes or milling machines, similarly to cams.

The cutters $V_1 V_2 \ldots X_1 X_2 \ldots$ being circularly ground on the inside face, are fitted on this spiral periphery and fixed by means of the nuts $Z_1$ and suitable washers $Z_2$. In order to avoid tangential play, slots like $L_1$ are made in the cutter block in which keys like $K_1$ are forced by means of screws like $E_1$. These keys have tapered sides in order to fix tangentially the cutters.

Apart from these constructional details, which can be altered for the same purpose, it will be appreciated that the finishing cutters $V_1$ and $X_1$ are disposed at 180° with the external cutting edge of $V_1$ substantially at the same radius R' as the internal cutting edge of the finishing cutter $X_1$.

The subsidiary external cutters $V_2 V_3 \ldots$ and the subsidiary internal cutters $X_2 X_3 \ldots$ are assembled near to the corresponding finishing cutters at different distances from the axis of the tool, due to the spiral periphery of the cutter block.

The direction of rotation of the cutter block is supposed to be according to the arrow I, then every subsidiary cutter has a smaller radius with respect to the previous one, in the type of cutter block shown by Figures 9 and 10.

In this type of cutter block the external subsidiary cutters $V_2 V_3 \ldots$ are disposed before the external finishing cutter $V_1$ in order to have, as they have, radii greater than the radius of the finishing external cutter.

Further, the internal subsidiary cutters $X_2$ $X_3$ ... are disposed after the internal finishing cutter $X_1$ in order to have, as they have, radii smaller than the radius of the finishing internal cutter.

I claim:—

1. A tool for cutting curved tooth bevel gears continuously by the generating process, in which the tool axis is parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut.

2. A tool for cutting curved tooth bevel gears continuously by the generating process, in which the tool axis is parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut and wherein the differences in distance from the axis of the tool of the subsidiary cutters depend on the distance between the axis of the tool and the basic crown wheel, on the small radius of the pitch cone, on the radius of the finishing cutters, and on the small diametral pitch of the teeth to be cut.

3. A tool for cutting curved tooth bevel gears continuously by the generating process, in which the tool axis is parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut and wherein every subsidiary cutter has a greater radius with respect to the previous cutter.

4. A tool for cutting curved tooth bevel gears continuously by the generating process, in which the tool axis is parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut and wherein every subsidiary cutter has a smaller radius with respect to the previous cutter.

5. A tool for cutting curved tooth bevel gears continuously by the generating process, in which the tool axis is parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut and wherein the external subsidiary cutters are disposed before or after the external finishing cutter in order to have radii always greater than the radius of the finishing external cutter.

6. A tool for cutting curved tooth bevel gears continuously by the generating process, in which the tool axis is parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut wherein the internal subsidiary cutters are disposed after or before the internal finishing cutters in order to have radii always smaller than the radius of the finishing internal cutter.

7. A tool for cutting curved tooth bevel gears continuously by the generating process comprising a cutter block with its periphery in the form of the spiral curves determined as hereinabove described, the cutters fitting on the said periphery and being fixed rigidly by well known means in order to avoid radial and tangential play, the tool axis being parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters the setting of these subsidiary cutters at different distances from the axis of the tool giving rise to paths displaced at the great end but coinciding at the small end of the teeth to be cut.

8. A tool for cutting curved tooth bevel gears continuously by the generating process comprising a cutter block with its periphery in the form of the spiral curves determined as hereinabove described, the cutters fitting on the said periphery and being fixed rigidly by well known means in order to avoid radial and tangential play, the tool axis being parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut and wherein the differences in distance from the axis of the tool of the subsidiary cutters depend on the distance between the axis of the tool and the basic crown wheel, on the small radius of the pitch cone, on the radius of the finishing cutters, and on the small diametral pitch of the teeth to be cut.

9. A tool for cutting curved tooth bevel gears continuously by the generating process comprising a cutter block with its periphery in the form of the spiral curves determined as hereinabove described, the cutters fitting on the said periphery and being fixed rigidly by well known means in order to avoid radial and tangential play, the tool axis being parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut wherein the internal subsidiary cutters are disposed after or before the internal finishing cutters in order to have radii always smaller than the radius of the finishing internal cutter.

10. A tool for cutting curved tooth bevel gears continuously by the generating process comprising a cutter block with its periphery in the form of a spiral curve determined as hereinabove described and an external ring rigidly connected with it, having its internal outline approximately of the same form as the said spiral curve, in which ring slots and screws or similar means are provided in order to fix the cutters rigidly on the outside periphery of the cutter block.

11. A tool for cutting curved tooth bevel gears continuously by the generating process comprising a cutter block with its periphery in the form of a spiral curve determined as hereinabove described and an external ring rigidly connected with it, having its internal outline approximately of the same form as the said spiral curve, in which ring slots and screws or similar means are provided in order to fix the cutters rigidly on the outside periphery of the cutter block, the tool axis being parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut and wherein the differences in distance from the axis of the tool of the subsidiary cutters depend on the distance between the axis of the tool and the basic crown wheel, on the small radius of the pitch cone, on the radius of the finishing cutters, and on the small diametral pitch of the teeth to be cut.

12. A tool for cutting curved tooth bevel gears continuously by the generating process comprising a cutter block with its periphery in the form of a spiral curve determined as hereinabove described and an external ring rigidly connected with it, having its internal outline approximately of the same form as the said spiral curve, in which ring slots and screws or similar means are provided in order to fix the cutters rigidly on the outside periphery of the cutter block, the tool axis being parallel to the axis of the basic crown wheel, having a plurality of cutters, of which two "finishing" cutters, disposed at 180°, have the external cutting edge of the external finishing cutter and the internal cutting edge of the internal finishing cutter substantially at the same radius and other "subsidiary" cutters with external and internal cutting edges assembled near the corresponding finishing cutters, the setting of these subsidiary cutters at different distances from the axis of the tool giving rise to paths displaced at the great end but coinciding at the small end of the teeth to be cut wherein the internal subsidiary cutters are disposed after or before the internal finishing cutters in order to have radii always smaller than the radius of the finishing internal cutter.

BENEDETTO MAMMANO.